United States Patent
Jin et al.

(10) Patent No.: US 9,738,139 B2
(45) Date of Patent: Aug. 22, 2017

(54) VEHICLE VISOR BRACKET AND VISOR ASSEMBLY EMPLOYING THE SAME

(71) Applicant: FORD GLOBAL TECHNOLOGIES, LLC, Dearborn, MI (US)

(72) Inventors: Xuezhi Jin, Nanjing (CN); Tom Xu, Nanjing (CN); Leo Chen, Nanjing (CN)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/161,380

(22) Filed: May 23, 2016

(65) Prior Publication Data
US 2017/0021702 A1   Jan. 26, 2017

(30) Foreign Application Priority Data

Jul. 20, 2015  (CN) .......................... 2015 1 0427907

(51) Int. Cl.
*B60J 3/00*   (2006.01)
*B60J 3/02*   (2006.01)

(52) U.S. Cl.
CPC .................................. *B60J 3/0221* (2013.01)

(58) Field of Classification Search
CPC ...................................................... B60J 3/0217
USPC ........................................ 296/214, 97.9, 1.08
See application file for complete search history.

(56) References Cited

U.S. PATENT DOCUMENTS

| | | | |
|---|---|---|---|
| 6,270,240 B1 | 8/2001 | Inoue | |
| 6,287,142 B1 | 9/2001 | Sawayanagi et al. | |
| 6,319,014 B1 * | 11/2001 | Gunay | B60J 3/0217 362/144 |
| 6,799,743 B2 * | 10/2004 | Sawayanagi | B60J 3/0217 248/224.8 |
| 8,424,950 B2 * | 4/2013 | Ebisuoka | B60J 3/0217 296/97.1 |
| 2001/0050498 A1 * | 12/2001 | Grimm | B60J 3/0213 296/214 |

\* cited by examiner

*Primary Examiner* — Dennis H Pedder
(74) *Attorney, Agent, or Firm* — Alice Xu; Mohr Intellectual Property Law Solutions, PC

(57) ABSTRACT

A visor bracket is provided to be mounted over a bracket aperture of an interior trim, where the visor bracket includes a bracket housing including a base and a side wall, the base defining a shaft aperture to receive there-through a support shaft of a visor panel, the side wall extending from the base and to be received through the bracket aperture along a mounting direction, and the visor bracket further includes an electrically-conducting material contacting the side wall.

11 Claims, 4 Drawing Sheets

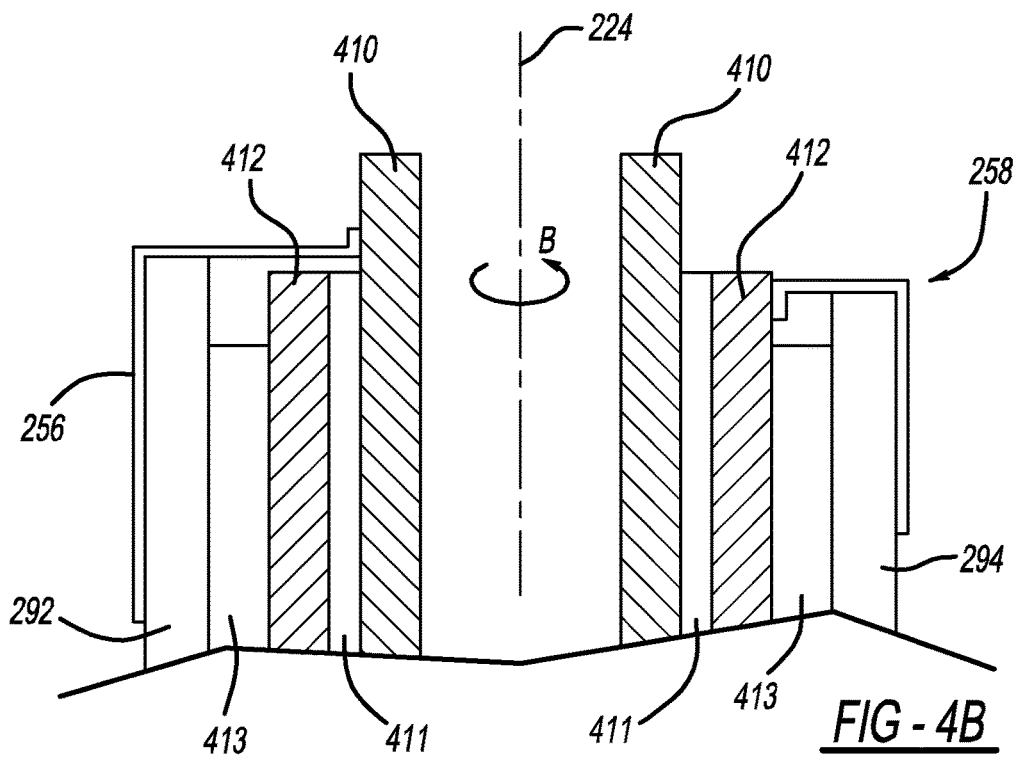
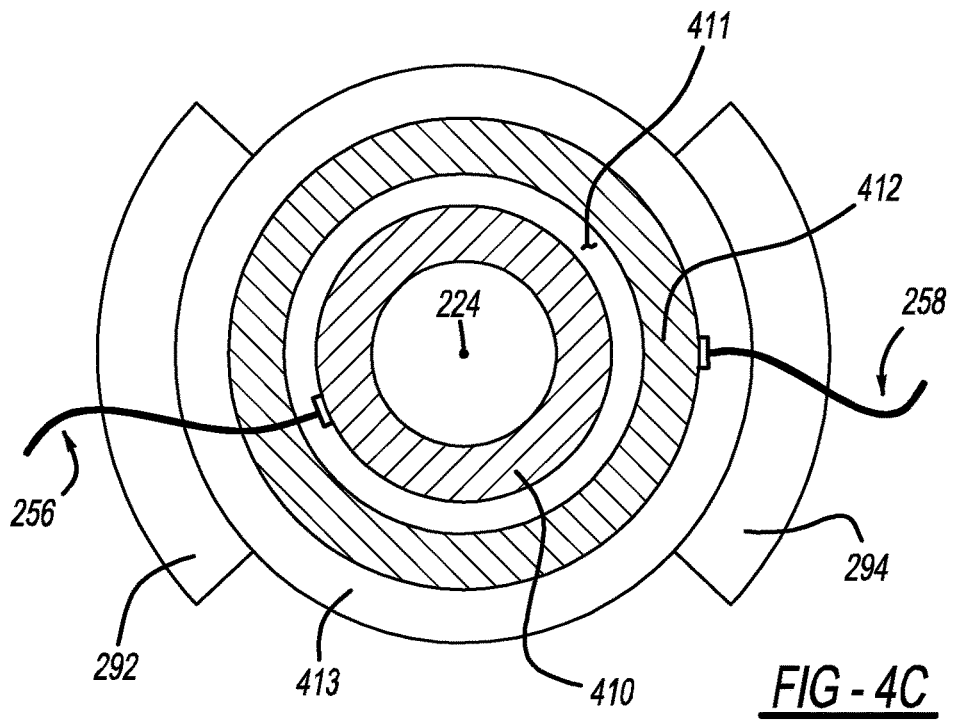

US 9,738,139 B2

VEHICLE VISOR BRACKET AND VISOR ASSEMBLY EMPLOYING THE SAME

RELATED APPLICATION(S)

This application claims the benefit of Chinese New Invention Patent Application No.: CN 201510427907.0, filed on Jul. 20, 2015, the entire contents thereof being incorporated herein by reference.

TECHNICAL FIELD

The present invention relates to a visor bracket of a vehicle and a visor assembly employing the same.

BACKGROUND

Vehicles are often equipped with visors or visor panels mounted onto the interior trim to shed away direct sunlight from hitting the driver or the front row passenger. In modern vehicles, additional functions have been imparted onto the visor panels, such as lighting functionalities added to certain visor panels. The visor panels therefore need to be electrically connected with the vehicle power system to obtain electricity for performing these additional functions.

By way of example, U.S. Pat. No. 6,799,743 B2 discloses a bracket for mounting auxiliary devices to the vehicle body, where a female connector of a visor side bracket is connected with a male connector of a panel side bracket so that the auxiliary devices such as the visor panel may be electrically connected to the vehicle power system.

SUMMARY

In one or more embodiments, a visor bracket is provided to be mounted over a bracket aperture of an interior trim, where the visor bracket includes a bracket housing including a base and a side wall, the base defining a shaft aperture to receive there-through a support shaft of a visor panel, the side wall extending from the base and to be received through the bracket aperture along a mounting direction, and the visor bracket further includes an electrically-conducting material contacting the side wall.

The side wall may include two opposing wall parts, the electrically-conducting material contacting both the two opposing wall parts.

The electrically-conducting material may include an electrically-conducting spring tab.

The electrically-conducting material may include an electrically-conducting coating.

The bracket housing may further include a pair of clamping walls to receive there-between a portion of the support shaft, and the electrically-conducting material is further in electrical communication with at least one of the pair of clamping wall.

In another one or more embodiments, a visor assembly is provided to be mounted over a bracket aperture of an interior trim, where the visor assembly includes a visor panel, a support shaft contacting the visor panel, a bracket housing including a base and a side wall, the base defining a shaft aperture to receive there-through the support shaft, the side wall extending from the base and to be received through the bracket aperture along a mounting direction, and an electrically-conducting material contacting the side wall and the interior trim.

The support shaft may include an electrically-conducting layer in electrical communication with the electrically-conducting material.

The electrically-conducting material may include a lead to contact the electrically-conducting layer.

In yet another one or more embodiments, a visor system of a vehicle is provided, where the visor system includes an interior trim defining a bracket aperture with a first side wall, a first electrically-conducting material contacting the first side wall; a bracket housing including a base and a second side wall, the base defining a shaft aperture to receive there-through a support shaft supporting a visor panel, the second side wall extending from the base and received through the bracket aperture along a mounting direction, and a second electrically-conducting material contacting the second side wall, where the first electrically-conducting material is in electrical communication with the second electrically-conducting material when the first and second side walls contact each other at a mounted position.

The visor system may further include a circuit board positioned next to the interior trim, where the circuit board is in electrical communication with the first electrically-conducting material.

The first electrically-conducting material may include an electrically-conducting spring tab.

One or more advantageous features as described herein will be readily apparent from the following detailed description of one or more embodiments when taken in connection with the accompanying drawings.

BRIEF DESCRIPTION OF THE DRAWINGS

For a more complete understanding of one or more embodiments of the present invention, reference is now made to the one or more embodiments illustrated in greater detail in the accompanying drawings and described below wherein:

FIG. 4B illustratively depicts a partial cross-section view of FIG. 4A, taken along line 4B-4B; and FIG. 4C illustratively depicts a partial top-down view of the visor bracket 100 referenced in FIG. 4A.

DETAILED DESCRIPTION OF ONE OR MORE EMBODIMENTS

Figure 1:
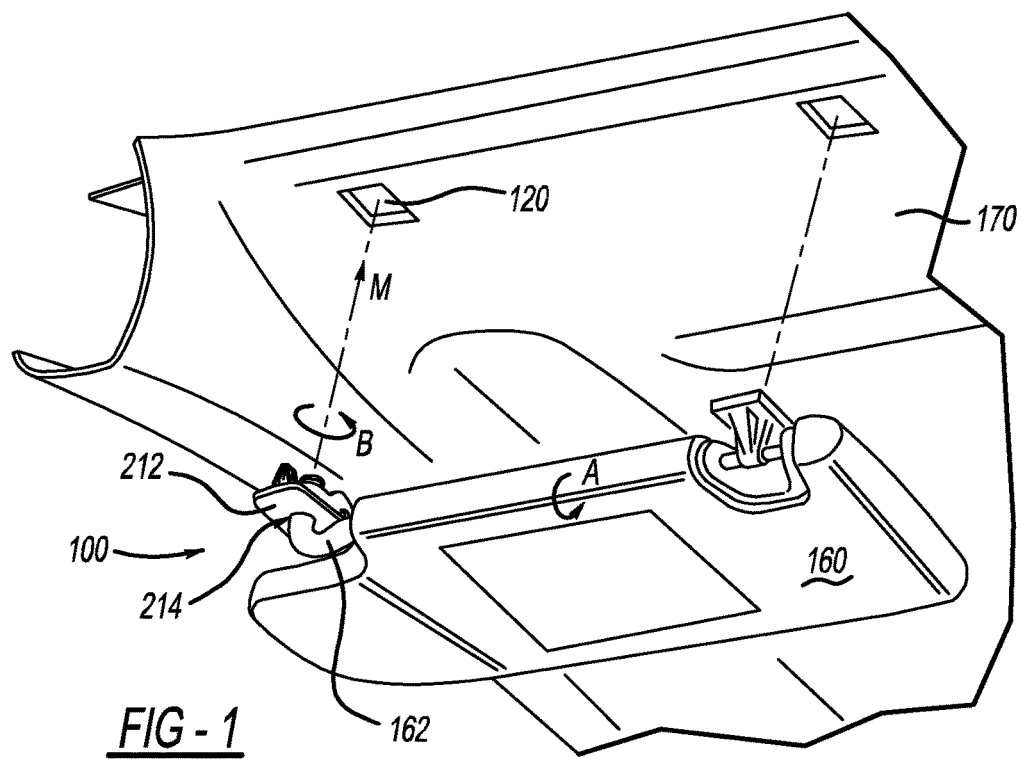
FIG. 1 illustratively depicts a perspective view of a visor panel and a visor bracket as positioned relative to a bracket aperture of a vehicle interior trim according to one or more embodiments.

As referenced in the FIG.s, the same reference numerals may be used to refer to the same parameters and components or their similar modifications and alternatives. These specific parameters and components are included as examples and are not meant to be limiting. The drawings referenced herein are schematic and associated views thereof are not necessarily drawn to scale.

As detailed herein elsewhere, the present invention in one or more embodiments is believed to be advantageous in providing a visor bracket to be mounted over a bracket aperture of an interior trim, such that a visor or a visor panel may be attached to the vehicle interior trim with greater ease. In particular, an electrically-conducting material is provided to contact a side wall of a bracket housing so as to enable electrical communication with the vehicle power system when the visor bracket is being mounted, such that there is not a necessary need to connect a plug with a socket prior to mounting the visor bracket by an operator, thus providing greater time and cost efficiencies in installation and manufacturing.

FIG. 1 through FIG. 4B illustratively depict various views, as positioned relative to an interior trim 170, of a visor bracket 100 to be mounted over a bracket aperture 120 of the interior trim 170 according to one or more embodiments of the present invention. The visor bracket 100 includes a bracket housing 210 including a base 212 and a side wall 216, the base 212 defining a shaft aperture 214 to receive there-through a support shaft 162 of a visor panel 160, the side wall 216 extending from the base 212 and to be received through the bracket aperture 120 along a mounting direction "M", and the visor bracket 100 further includes an electrically-conducting material 250 contacting the side wall 216.

The interior trim 170 may be positioned inside of the vehicle, and may be exposed to a cabin interior of the vehicle. For illustration purposes, the interior trim 170 is illustratively depicted as the roof trim panel and being located at an upper location along the mounting direction "M". Sheet metal at the roof (not shown) may be located above the interior trim 170 as shown in FIG. 1, or may be located further away from a vehicle occupant relative to the interior trim 170. In other embodiments, it is to be appreciated that the interior trim 170 may be formed as a side trim panel and the visor panel 160 may be attached to the side trim panel via the visor bracket 100.

The interior trim 170 defines a bracket aperture 120 with a first side wall 310, over which the visor bracket 100 may be mounted as detailed herein elsewhere. The bracket aperture 120 is illustratively depicted as a rounded rectangle in FIG. 1. In another one or more embodiments, the bracket aperture 120 may be of any suitable shape and size, such as rounds, ovals, rectangles, triangles, and any other suitable regular or irregular geometrical shapes. The first side wall 310 of the bracket aperture 120 may extend substantially along a thickness direction of the interior trim 170 or the mounting direction "M", and may be formed as a through aperture located on the interior trim 170.

Referring back to FIG. 1, the visor bracket 100 may be mounted over the bracket aperture 120 formed on the interior trim 170 along the mounting direction "M". In particular, and when being mounted, the visor bracket 100 may be inserted toward the bracket aperture 120 along the mounting direction "M", and securely attached to the interior trim 170 thereafter. Although a clip 260 is shown in FIG. 2, in other embodiments, the visor bracket 100 and the interior trim 170 may be attached to each other via other suitable methods such as screws, bolts and adhesives.

In certain embodiments, and as illustratively depicted in FIG. 1, the base 212 is larger in dimensions than the bracket aperture 120. Accordingly, the base 212 as mounted may cover up the bracket aperture 120 on the interior trim 170, so as to reduce unwanted exposure of contents otherwise viewable through the bracket aperture 120, with these contents including sheet metals or cables, and therefore to provide a better aesthetic appearance. It is to be appreciated, however, that the base 212 may be of the same or smaller dimensions relative to the bracket aperture 120 when desirable in certain other embodiments.

Although the base 212 is illustratively depicted in the FIGs as a flat panel, it may be of other regular or irregular shapes as desirable, such as the shapes of an arc, a hemisphere and a box, as mention herein elsewhere.

Figure 2:
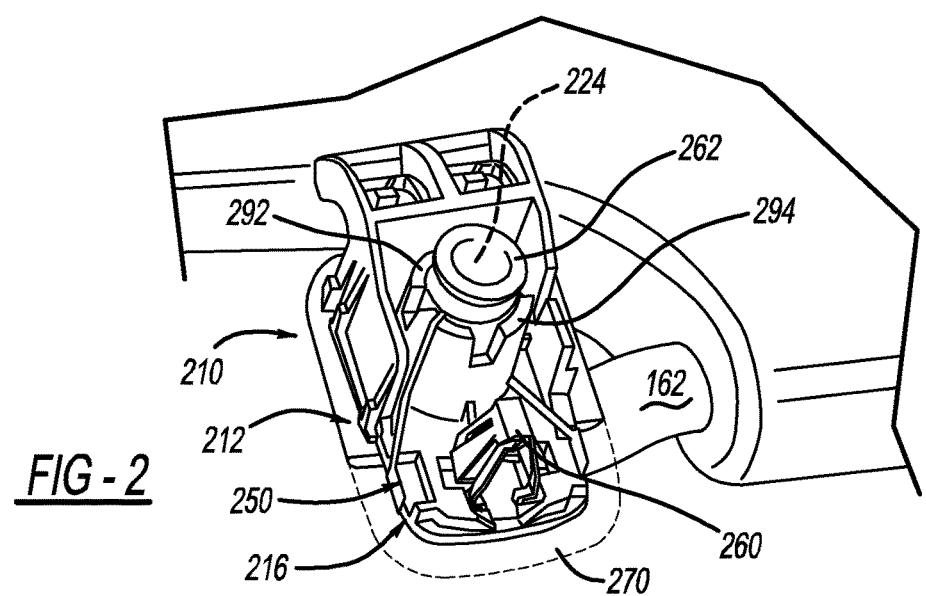
FIG. 2 illustratively depicts an enlarged view of the visor bracket referenced in FIG. 1.

To facilitate assembly and dissembly the visor bracket 100 onto and away from the interior trim 170, the visor bracket 100 may further include a detachable cover 270 as illustratively depicted in a dash line in FIG. 2, which may be detachably connected to the base 212. The cover 270 may be of the same or similar appearance as the base 212. Accordingly, the cover 270 may be rotatably detached from the base 212 before the visor bracket 100 is being assembled or dissembled, so as to ease the assembly steps such as the steps involving the clip 260. Once the assembly is accomplished, the cover 270 may thereafter be attached to the visor bracket 100 or in particular the base 212 to reduce unwanted exposure of contents such as the clip 260.

Figure 4A:
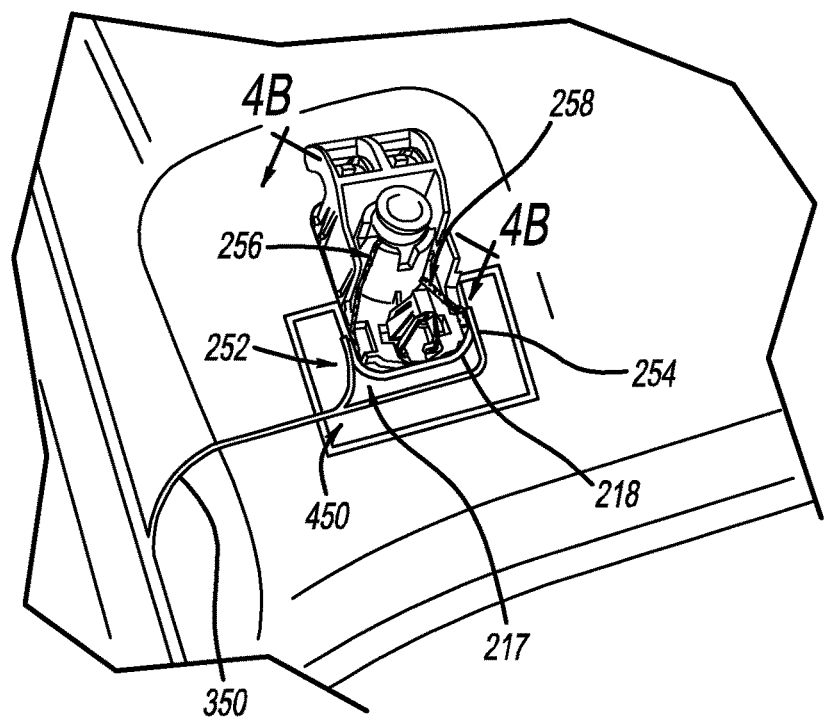
FIG. 4A illustratively depicts an assembled view of the vehicle interior trim with the visor bracket as referenced in FIG. 3A.

Referring back to FIG. 2, the side wall 216 of the visor bracket 100, or the second side wall 216 as noted herein elsewhere, may extend from the base 212 toward the back side of the interior trim 170 along the mounting direction "M" so as to at least partially pass through and be received within the bracket aperture 120. Accordingly, when the visor bracket 100 is at a mounted position as depicted in FIG. 4A, the first side wall 310 of the bracket aperture 120 and the second side wall 216 of the visor bracket 100 may snuggly contact each other, so as to reduce unwanted NVH (noise, vibration, and harshness) which may otherwise be caused by movement of the visor bracket 100 within the bracket aperture 120.

Furthermore, and because the bracket aperture 120 may already be in the operator's plain eyesight prior to the assembly of the visor bracket 100, the visibility helps in that the visor bracket 100 may be aligned with and inserted into the bracket aperture 120 with greater ease. As desirable, the height through which the second side wall 216 extends from the base 216 may be smaller, the same, or greater relative to the height of the first side wall 310 along direction "M".

Figure 3A:
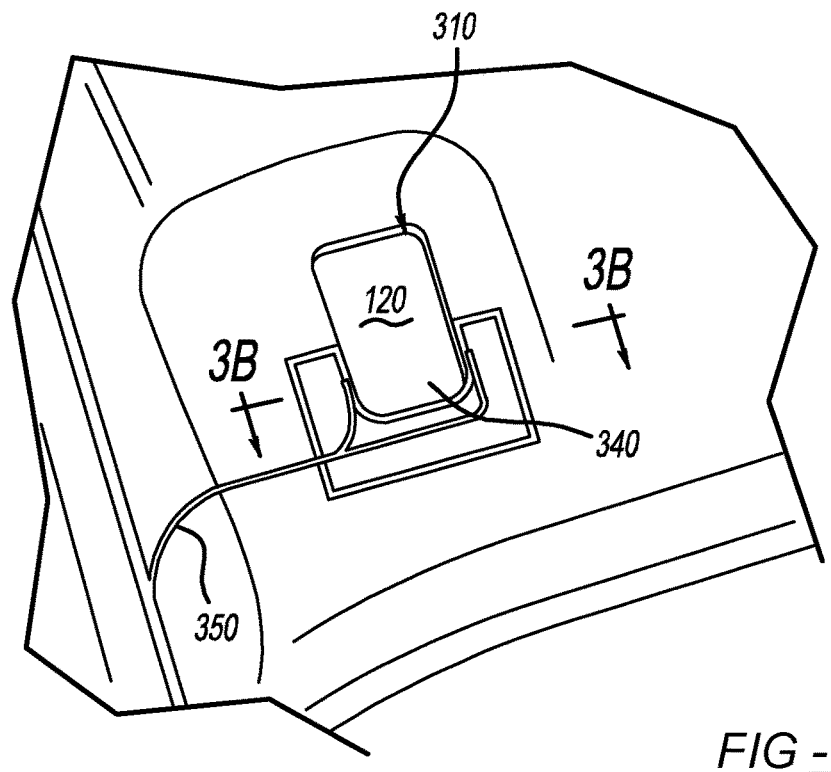
FIG. 3A illustratively depicts a back view or a top-down view of the vehicle interior trim with the bracket aperture referenced in FIG. 1.
Figure 3B:
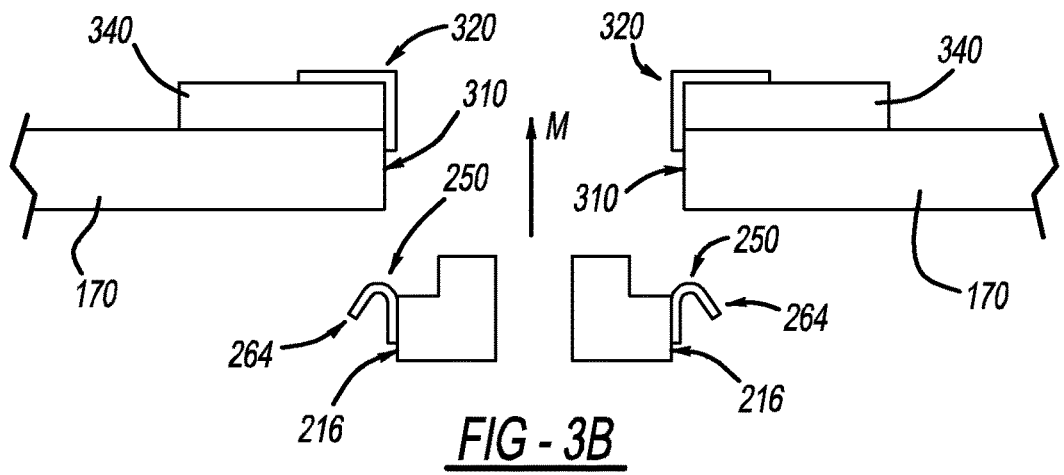
FIG. 3B illustratively depicts a cross-section view of the bracket aperture as referenced in FIG. 3A, taken along line 3B-3B.

FIG. 3A through 3B illustratively depict views of a back side and a cross-section of the interior trim 170 with the bracket aperture 120 according to one or more embodiments of the present invention. As detailed herein elsewhere, the bracket aperture 120 has the first side wall 310 contacting a first electrically-conducting material 320. In a non-limiting example and as depicted in FIG. 3A through 3B, the first electrically-conducting material 320 is configured as a metallic tab contacting the first side wall 310, which is in turn in electrical communication with the circuit board 340.

The visor bracket 100 may include the second electrically-conducting material 250 to contact the side wall 216 and to correspond to the first electrically-conducting material 320. Similar to the first electrically-conducting material 320, the second electrically-conducting material 250 may be formed as a metallic tab contacting the side wall 216. Accordingly, as detailed herein elsewhere, and when the second side wall 216 of the visor bracket 100 extends through the bracket aperture 120 and contacts the first side wall 310, the second electrically-conducting material 250 contacting the second side wall 216 may become in electrical communication with the first electrically-conducting material 320.

To engage for electrical connectivity, the visor bracket 100 may be moved in the mounting direction M such that the first electrically-conducting material 320 may contact the second electrically-conducting material 250 to effectuate an electrical connection at a mounted position. In certain embodiments, and as illustratively depicted in FIG. 3B, the first electrically-conducting material 320 may be configured as a metallic tab contacting both the first side wall 310 of the bracket aperture 120 and the circuit panel 340 positioned on the back side of the interior trim 170. To provide relatively enhanced structural engagement as well as electrical communication, the second electrically-conducting material 250 may be configured as including a spring tab 264 that is tension charged. Such configuration is particularly advantageous in that the spring tab 264 may engage the first side wall 310 or the first electrically-conducting material 320 under a spring force when the second side wall 216 contacts the first side wall 310, thereby providing enhanced electrical connectivity between the first electrically-conducting material 320 and the second electrically-conducting material 250 via close contact, while avoiding unwanted vibrations of the visor bracket 100 relative to the bracket aperture 120.

Figure 3C:
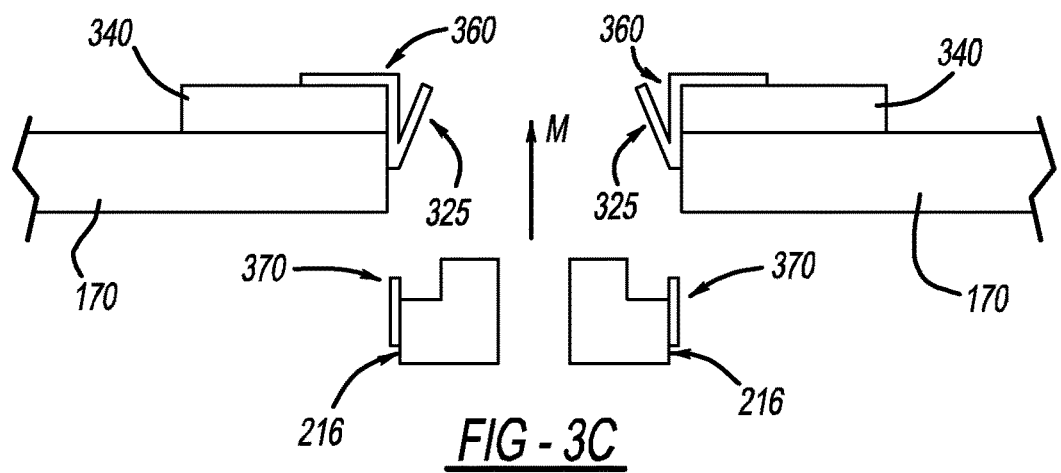
FIG. 3C illustratively depicts an alternative view of the cross-section of FIG. 3B.

In another one or more embodiments, and as illustratively depicted in FIG. 3C, a first electrically-conducting material 360 as a structural variation to the first electrically-conducting material 320 referenced in FIG. 3B may be configured as including a spring tab 325 that is tension charged, and a second electrically-conducting material 370 as a structural variation to the second electrically-conducting material 250 referenced in FIG. 3B may be configured as an electrically-conducting metallic tab.

Alternatively, and in a collective view of FIG. 3B and FIG. 3C, the first electrically-conducting material 320 referenced in FIG. 3B and the first electrically-conducting material 360 referenced in FIG. 3C may each be independently employed to contact the first side wall 310. For the same token, the second electrically-conducting material 250 referenced in FIG. 3B and the second electrically-conducting material 370 referenced in FIG. 3C may each be independently employed to contact the second side wall 216. In certain embodiments, the first electrically-conducting material 360 and the second electrically-conducting material 250 are employed where both materials may be formed as spring tabs so as to enhance the connectivity.

In one or more embodiments and as illustratively depicted in FIG. 3D through 4A, the first side wall 310 may include two opposing wall parts 312, 314, and first electrically-conducting materials 322, 324 may contact the wall parts 312, 314, respectively. Similarly, the second side wall 216 may include two opposing wall parts 217, 218, and second electrically-conducting materials 252, 254 may contact the wall parts 217, 218, respectively. The first electrically-conducting materials 322, 324 may differ from each other in material, shape or electrical conductivity so as to provide greater design flexibility. Moreover, such configuration may help form a current circuit with greater ease and reduce the possibility of a short circuit due to contact between metallic tabs 322 and 324, or metallic tabs 252 and 254. It is to be appreciated that the metallic tabs 322, 324 and/or metallic tab 252, 254 may also be positioned on the same wall when desirable in consideration for packaging.

Figure 3D:
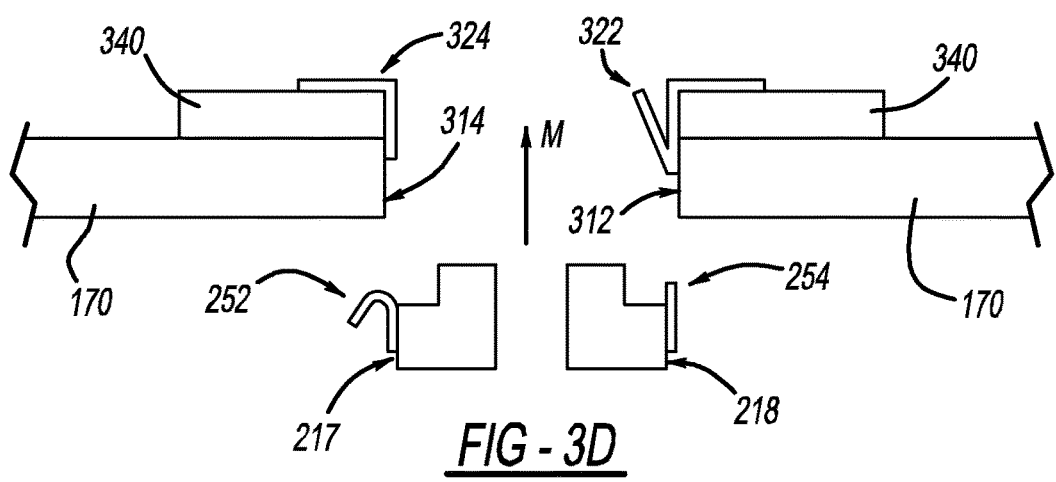
FIG. 3D illustratively depicts another alternative view of the cross-section of FIG. 3B.

The first electrically-conducting material 322, 324 may be of any suitable configuration, and as illustratively depicted in FIG. 3D, may be of the configuration of the first electrically-conducting material 320 referenced in FIG. 3B and/or of the configuration of the first electrically-conducting material 360 referenced in FIG. 3C.

The second electrically-conducting material 252, 254 may be of any suitable configuration, and as illustratively depicted in FIG. 3D, may be of the configuration of the second electrically-conducting material 250 referenced in FIG. 3B and/or of the configuration of the second electrically-conducting material 370 referenced in FIG. 3C.

Referring back to FIG. 3A, and in one or more embodiments, the circuit board 340 is provided to contact the back side of the interior trim 170. The first electrically-conducting material 320, 360, 322, and/or 324 may be in electrical communication with the circuit board 340, and may be connected with the power main of the vehicle and hence the vehicle power system via a leading wire 350. The circuit board 340 so provided as to contact the interior trim 170 is particularly advantageous by not demanding excess space requirement on the back side of the interior trim 170, reducing defective contact between the leading wire 350 and the first electrically-conducting material 320, 360, 322, and/or 324, and reducing the occurrence of a short circuit due to unwanted intertwining of the leading wire 350 with other components present on the back side of the interior trim 170. It is to be appreciated that the circuit board 340 does not have to be employed, and in such scenarios the wire 350 may be secured to the interior trim 170 via commonly suitable methods such as clips and adhesives.

Furthermore, the bracket housing 210 of the visor bracket 100 may include the base 212 defining a shaft aperture 214. A support shaft 162 supporting the visor panel 160 may be received through the shaft aperture 214, such that the support shaft 162 may rotate within the shaft aperture 214 about direction B. In addition, the support shaft 162 may also be connected to the visor panel 160 and may rotate in direction A relative to the visor panel 160. Accordingly, the vehicle occupant may adjust the position or orientation of the visor panel 160 freely as desirable.

In one or more embodiments, and as illustratively depicted in FIG. 2, 4A through 4C, the bracket housing 210 may further include a pair of clamping walls 292, 294 extending from the base 212, and at least a portion 262 of the support shaft 162 may be received between the pair of clamping walls 292, 294. In particular, at least the portion 262 of the support shaft 162 may include a first electrically-conducting layer 410, a first electrically-isolating layer 411, a second electrically-conducting layer 412, and a second electrically-isolating layer 413 wrapping around a central axis C. When desirable, the portion 262 of the support shaft 162 may be of more or fewer electrically-conducting layers.

The first electrically-conducting layer 410 and the second electrically-conducting layer 412 may conduct electric current for electricity-consuming parts inside of or surrounding the visor panel 160, such as lighting devices (not shown). Accordingly, electrical communication between the second electrically-conducting material 250 and the electricity-consuming parts may be effectuated by two leads 256, 258 respectively contacting the first electrically conducting layer 410 and the second electrically-conducting layer 412. The leads 256, 258 may be configured as a spring tab, thereby providing connectivity between the second electrically-conducting material 250 and the electricity-consuming parts without having to compromise on the rotation of the shaft 224 in direction B relative to the bracket housing 210. It is to be appreciated that the electrical communication between the second electrically-conducting material 250 and the electricity-consuming parts may be effectuated by any other suitable methods.

Referring back to FIG. 4A and further in view of FIG. 4B and FIG. 4C, an electric circuit may be formed when the lead 256 connects the electrically-conducting material 252, the lead 258 connects the electrically-conducting material 254, and the electrically-conducting materials 252, 254 are in turn in communication with the circuit board 340 via the leading wire 350. Suitable insulating material may be provided to area 450 to reduce the possibility of a short circuit.

In general, and in view of the embodiments referenced in the FIGs, the electricity-consuming parts may be electrically connected to the vehicle power system via the electrically conducting layer 410 or 412 of the shaft 224, the lead 256 or 258, the second electrically-conducting material 250, 370, 252, 254, the first electrically-conducting material 320, 360, 322, 324, the circuit board 340, the leading wire 350, and power main to provide power to the electricity-consuming parts. Such configuration is particularly advantageous in that electrical communication between the electricity-consuming parts and the vehicle power system may be effectuated right during the process of the visor bracket 100 being mounted to the bracket aperture 120, without necessarily having to pre-connect the male and female connectors prior to mounting the visor bracket by an operator, thus providing greater time and cost efficiency in manufacturing. Also, the first electrically-conducting material 320, 360, 322, 324 and second electrically-conducting material 250, 370, 252, 254 are positioned at edges of the visor bracket 100 and the bracket aperture 120, so that alignment and contact between the two materials 322, 250 may be effectuated naturally as the visor bracket 100 gets inserted into the bracket aperture 120, thus providing ease for the assembling process.

The term "electrically-conducting" refers to a material's capacity and/or configuration by which the material may permit the flow of electrical current in one or more directions. The electrically-conducting materials mentioned herein, such as the first electrically-conducting material 320, 360, 322 and 324, and the second electrically-conducting material 250, 370, 252 and 254, may each include and be of any metallic or non-metallic entities, such as metals, electrolytes, superconductors, semiconductors, plasmas, graphite and conductive polymers. Non-limiting examples of such metallic entities include copper, annealed copper, aluminum, silver and gold. Non-limiting examples of such non-metallic entities include salts, and electrolytes and certain carbons such as graphite.

Alternatively also, the electrically-conducting materials mentioned herein, such as the first electrically-conducting material 320, 360, 322 and 324, and the second electrically-conducting material 250, 370, 252 and 254, may be configured as a patch, a tape or a layer with electrical conductivity. Non-limiting examples of such electrically-conductive patches and tapes may be available from Henkel Corporation.

In one or more embodiments, the present invention provides a vehicular visor bracket and a visor assembly employing the same. One skilled in the art will readily recognize from such discussion, and from the accompanying drawings and claims that various changes, modifications and variations can be made therein without departing from the true spirit and fair scope of the invention as defined by the following claims.

What is claimed is:

1. A visor bracket to be mounted over a bracket aperture of an interior trim, comprising:
   a bracket housing including a base and a side wall, the base defining a shaft aperture to receive there-through a support shaft of a visor panel, the side wall extending from the base and to be received through the bracket aperture along a mounting direction; and
   an electrically-conducting material contacting the side wall and the interior trim.

2. The visor bracket of claim 1, wherein the side wall includes two opposing wall parts, the electrically-conducting material contacting both the two opposing wall parts.

3. The visor bracket of claim 1, wherein the electrically-conducting material includes an electrically-conducting spring tab.

4. The visor bracket of claim 1, wherein the electrically-conducting material includes an electrically-conducting coating.

5. The visor bracket of claim 1, wherein the bracket housing further includes a pair of clamping walls to receive there-between a portion of the support shaft, and the electrically-conducting material is further in electrical communication with at least one of the pair of clamping walls.

6. A visor assembly to be mounted over a bracket aperture of an interior trim, comprising:
   a visor panel;
   a support shaft contacting the visor panel;
   a bracket housing including a base and a side wall, the base defining a shaft aperture to receive there-through the support shaft, the side wall extending from the base and to be received through the bracket aperture along a mounting direction; and
   an electrically-conducting material contacting the side wall and the interior trim.

7. The visor assembly of claim 6, wherein the support shaft includes an electrically-conducting layer in electrical communication with the electrically-conducting material.

8. The visor assembly of claim 7, wherein the electrically-conducting material includes a lead contacting the electrically-conducting layer.

9. A visor system of a vehicle, comprising:
   an interior trim defining a bracket aperture with a first side wall;
   a first electrically-conducting material contacting the first side wall;
   a bracket housing including a base and a second side wall, the base defining a shaft aperture to receive there-through a support shaft supporting a visor panel, the second side wall extending from the base and received through the bracket aperture along a mounting direction; and
   a second electrically-conducting material contacting the second side wall, wherein the first electrically-conducting material is in electrical communication with the second electrically-conducting material when the first and second side walls contact each other at a mounted position.

10. The visor system of claim 9, further comprising a circuit board positioned next to the interior trim, wherein the circuit board is in electrical communication with the first electrically-conducting material.

11. The visor system of claim 9, wherein the first electrically-conducting material includes an electrically-conducting spring tab.

* * * * *